US012719944B2

(12) United States Patent
Clift

(10) Patent No.: US 12,719,944 B2
(45) Date of Patent: Aug. 25, 2026

(54) ADAPTIVE TRANSITION BETWEEN MEDIA CONTENTS IN CONTENT DELIVERY SYSTEMS

(71) Applicant: SONY GROUP CORPORATION, Tokyo (JP)

(72) Inventor: Graham A Clift, Poway, CA (US)

(73) Assignee: SONY GROUP CORPORATION, Tokyo (JP)

( * ) Notice: Subject to any disclaimer, the term of this patent is extended or adjusted under 35 U.S.C. 154(b) by 71 days.

(21) Appl. No.: 18/960,598

(22) Filed: Nov. 26, 2024

(65) Prior Publication Data

US 2025/0184384 A1 Jun. 5, 2025

Related U.S. Application Data

(60) Provisional application No. 63/604,716, filed on Nov. 30, 2023.

(51) Int. Cl.
*H04L 65/75* (2022.01)
*H04N 21/442* (2011.01)

(52) U.S. Cl.
CPC ..... *H04L 65/764* (2022.05); *H04N 21/44209* (2013.01)

(58) Field of Classification Search
CPC ........................ H04L 65/765; H04N 21/44209
See application file for complete search history.

(56) References Cited

U.S. PATENT DOCUMENTS

| | | | | |
|---|---|---|---|---|
| 11,627,368 | B1 * | 4/2023 | Grover | H04L 65/612 725/93 |
| 2016/0044078 | A1 | 2/2016 | Hosur | |
| 2017/0070758 | A1 | 3/2017 | Phillips et al. | |
| 2018/0109468 | A1 | 4/2018 | Sridhar et al. | |
| 2021/0409816 | A1 * | 12/2021 | Menon | H04N 21/44209 |
| 2023/0164383 | A1 * | 5/2023 | Candelore | H04H 20/26 725/62 |
| 2024/0291878 | A1 * | 8/2024 | Zaruba | H04L 65/1069 |

* cited by examiner

*Primary Examiner* — John B Walsh
*Assistant Examiner* — Steven C Nguyen
(74) *Attorney, Agent, or Firm* — CHIP LAW GROUP

(57) ABSTRACT

An electronic device and a method for adaptive switching in content delivery systems. The electronic device receives media content for playback. The electronic device determines the received media content including first media content and second media content. The electronic device compares first bit rate of the first media content with second bit rate of the second media content. The electronic device sets the reported bit rate of the media player to a second determined value, based on the comparison. The electronic device controls the media player to playback of the second media content, based on the second determined value. The electronic device monitors the reception of the media content. The electronic device sets the reported bit rate of the media player to a third determined value. The electronic device controls the media player to switch playback to the first media content, based on the third determined value.

20 Claims, 5 Drawing Sheets

ADAPTIVE TRANSITION BETWEEN MEDIA CONTENTS IN CONTENT DELIVERY SYSTEMS

CROSS-REFERENCE TO RELATED APPLICATIONS/INCORPORATION BY REFERENCE

This Application also makes reference to U.S. Provisional Application Ser. No. 63/604,716, which was filed on Nov. 30, 2023. The above stated Patent Application is hereby incorporated herein by reference in its entirety.

FIELD

Various embodiments of the disclosure relate to content delivery systems. More specifically, various embodiments of the disclosure relate to an electronic device and a method to perform adaptive transition between media contents in the content delivery systems.

BACKGROUND

Advancements in the field of telecommunication and video compression technologies have led to the development of video delivery systems that are designed to provide media content to users through various transmission methods. In the realm of video delivery, a multitude of standards and protocols have been established to not only enable the efficient transfer and reception of media content, but efficiently perform adaptive transition between media contents in content delivery systems as well. Such standards and protocols may support a range of features, which may also include enhanced video and audio quality, interactive services, and access to multiple content streams.

The delivery of live video services and the adaptive transition of the media contents may often involve the use of different transmission sources and methods. The transition between the media sources during playback can be intricate, and sometimes may require manual intervention or sophisticated algorithms. The overall experience of video playback can be influenced by several factors, which also includes the consistency and reliability of the transmission sources, the strength and stability of the connection through which the content is delivered, and the display resolution of the media content. There is a need to improve a user experience of playback of the media content, based on a simplification of the process of source transition and an enhancement the playback quality of media content Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method to perform adaptive transition between media contents in content delivery systems is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
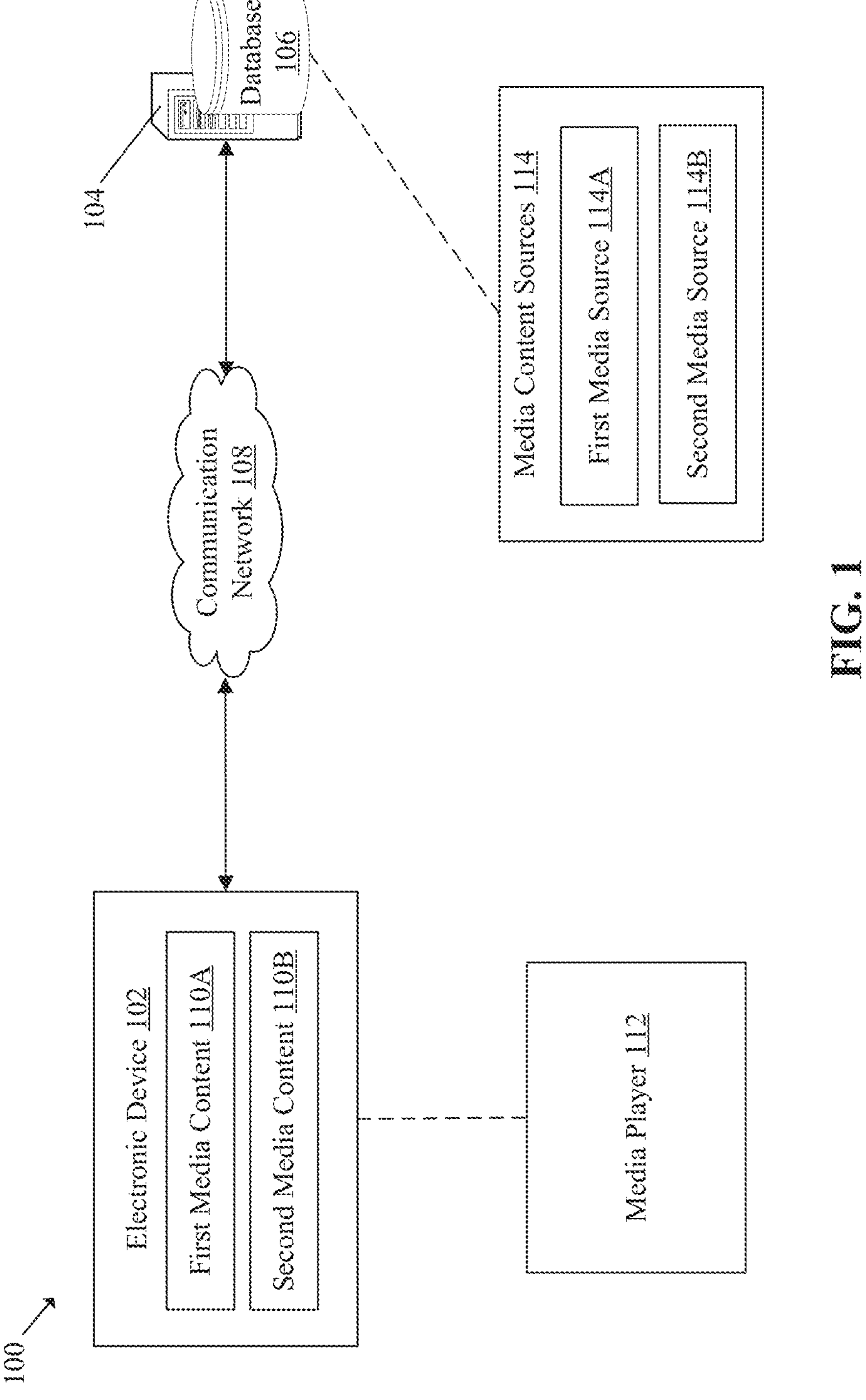
FIG. 1 is a block diagram that illustrates an exemplary network environment to adaptively switch between media contents in content delivery systems, in accordance with an embodiment of the disclosure.

The present disclosure relates to an adaptive live video delivery system that may utilize both broadband and broadcast sources. The following described implementation may be found in an electronic device and method that may be configured to adaptively switch between media contents in content delivery systems. Exemplary aspects of the present disclosure may provide an electronic device that may be configured to receive a media content for playback on a media player. A reported bit rate of the media player may be set to a first determined value. Next, the electronic device may determine that the received media content includes a first media content over an Over the Air (OTA) media stream and a second media content over an Over the Top (OTT) media stream. The electronic device may compare a first bit rate of the OTA media stream with a second bit rate of the OTT media stream, based on the determination that the received media content includes the first media content and the second media content. The electronic device may then set the reported bit rate of the media player to a second value higher than the second bit rate of the OTT media stream, based on the comparison of the first bit rate and the second bit rate. The electronic device may then control the media player to playback of the second media content, based on the reported bit rate of the media player set to the second determined value. The electronic device may then monitor the reception of the media content. The electronic device may then set the reported bit rate of the media player set to a third determined value, based on the monitored reception of the media content. The electronic device may then control the media player to switch the playback from the second media content to the first media content, based on the reported bit rate of the media player set to the third determined value.

Traditional systems may often rely on a single media source, either broadband or broadcast, which can lead to interruptions in service if the source becomes unavailable or congested. In contrast, the disclosed electronic device may intelligently switch between broadband and broadcast sources based on various conditions such as service availability, connection quality, and video resolution, which may ensure a seamless viewing experience.

The electronic device may have adaptive capabilities that may allow automatic adjustment of content playback transition based on the current conditions. For instance, if the quality of the broadband connection is low, the electronic device may switch to a broadcast source to maintain continuous stream of the media contents. Conversely, if the broadcast signal is weak, the electronic device may dynamically switch to a broadband source to enhance picture quality. Thus, unlike traditional systems, the disclosed electronic device may not require manual intervention to switch sources. Furthermore, the disclosed electronic device may be designed to support both broadcast receivers that support broadband representations of live content, and also, applications that are designed to primarily support broadband playback of live content but also have access to a broadcast tuner. The dual support may allow the electronic device to cater to a wider range of use cases and scenarios, which may make the electronic device more versatile than traditional systems that support either broadcast or broadband delivery.

The disclosed electronic device may include features for detection of service availability and assessment of the quality of the service, which can help to ensure a robust and reliable video stream. Such features, combined with the adaptive capabilities, may work together to provide a superior viewing experience for live video content, regardless of the source of delivery. The disclosed electronic device may thereby deliver a marked improvement in content playback experience while transition from one media content to another media content over traditional systems, which may often struggle to maintain a consistent quality of service during playback transition from the when faced with changing network conditions.

FIG. 1 is a block diagram that illustrates an exemplary network environment to adaptively switch between media contents in the content delivery systems, in accordance with an embodiment of the disclosure. With reference to FIG. 1, there is shown a network environment 100. The network environment 100 may include an electronic device 102, a server 104, a database 106, and a communication network 108. The electronic device 102 may include a media player 112 configured to playback of first media content 110A and second media content 110B. FIG. 1 further shows media content sources 114 that may be associated with the electronic device 102 and the media player 112. In FIG. 1, there is further shown a first media source 114A and a second media source 114B that may be stored in the database 106. Further, there is shown a user who may be associated with and/or operate the electronic device 102.

The electronic device 102 may include suitable logic, circuitry, interfaces, and/or code that may be configured to receive the media content for playback on the media player 112. A reported bit rate of the media player 112 may be set to a first determined value. The electronic device 102 may determine that the received media content includes the first media content 110A over an over-the-air (OTA) media stream and the second media content 110B over an over-the-top (OTT) media stream. The electronic device 102 may compare a first bit rate of the OTA media stream with a second bit rate of the OTT media stream, based on the determination that the received media content includes the first media content 110A and the second media content 110B. The electronic device 102 may set the reported bit rate of the media player 112 to a second determined value higher than the second bit rate of the OTT media stream, based on the comparison of the first bit rate and the second bit rate. The electronic device 102 may control the media player 112 to playback of the second media content 110B, based on the reported bit rate of the media player 112 set to the second determined value. Thereafter, the electronic device 102 may monitor reception of the media content. The electronic device 102 may set the reported bit rate of the media player 112 to a third determined value, based on the monitored reception of the media content. The electronic device 102 may control the media player 112 to switch the playback from the second media content 110B to the first media content 110A, based on the reported bit rate set to the third determined value. Examples of the electronic device 102 may include, but are not limited to, a computing device, a smartphone, a cellular phone, a mobile phone, a gaming device, a mainframe machine, a server, a computer workstation, a wearable device, and/or a consumer electronic (CE) device.

The server 104 may include suitable logic, circuitry, and interfaces, and/or code that may be configured to receive the media content for playback on the media player 112. The server 104 may determine that the received media content includes the first media content 110A over the OTA media stream and the second media content 110B over the OTT media stream. The server 104 may compare the first bit rate of the OTA media stream with the second bit rate of the OTT media stream, based on the determination that the received media content includes the first media content 110A and the second media content 110B. The server 104 may set the reported bit rate of the media player 112 to the second determined value higher than the second bit rate of the OTT media stream, based on the comparison of the first bit rate and the second bit rate. The server 104 may control the media player 112 to playback of the second media content 110B, based on the reported bit rate of the media player 112 set to the second determined value. The server 104 may monitor the reception of the media content. The server 104 may set the reported bit rate of the media player 112 to the third determined value, based on the monitored reception of the media content. The server 104 may control the media player 112 to switch the playback from the second media content 110B to the first media content 110A, based on the reported bit rate of the media player 112 set to the third determined value.

The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the media content sources 114. The database 106 may be configured to store the first media source 114A and the second media source 114B. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device which stores the database 106 may be configured to receive a query for the media content playback on the media player 112 from the electronic device 102 or the server 104. In response, the device of the database 106 may be configured to retrieve and provide the queried media content to the electronic device 102 or the server 104 for the playback, based on the received query.

In some embodiments, the database 106 may be hosted on a plurality of servers stored at the same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 and the server 104 may communicate with one another. The communication network 108 may be one of a wired connection or a wireless connection. Examples of the communication network 108 may include, but are not limited to, the Internet, a cloud network, Cellular or Wireless Mobile Network (such as Long-Term Evolution and $5^{th}$ Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The first media content 110A and the second media content 110B may be configured to be played through the media player 112 of the electronic device 102. The first media content 110A may correspond to the OTA media content and may be associated with the first media source 114A. The second media content 110B may correspond to the OTT media content and may be associated with the second media source 114B.

The media player 112 may include suitable logic, circuitry, interfaces, and/or code configured to play the first media content 110A and the second media content 110B. The media player 112 may be configured to receive the media content (e.g., the first media content 110A and the second media content 110B) for playback through the electronic device 102. The media player 112 may include a stream buffer that may store chunks or segments of the media content during the reception and playback of the media content for bit rate matching between the reception and playback. Further, the media player 112 may determine a bit rate of each media stream of the OTA media stream (e.g., from the first media source 114A) and the OTT media stream (e.g., from the second media source 114B).

The media content sources 114 may include the first media source 114A and the second media source 114B, respectively, for playback. In an embodiment, the media content sources 114 may include one or more types of content distribution equipment that may also include a television distribution facility, a cable system headend, a satellite distribution facility, programming sources (e.g., television broadcasters), intermediate distribution facilities and/or servers, Internet providers, on-demand content servers, and other content providers. The media content sources 114 may be an originator of content (e.g., in case of a television broadcaster or a Webcast provider) or may be distributor of content (e.g., an intermediatory entity that provides an on-demand content, or an Internet Service Provider).

In operation, the electronic device 102 may receive media content for playback on the media player 112. The reported bit rate of the media player 112 may be set to the first determined value. The received media content may refer to the first media content 110A over the OTA media stream and the second media content 110B over the OTT media stream. In an example, the electronic device 102 may retrieve the first media content 110A and the second media content 110B from the database 106. In another example, the electronic device 102 may receive the first media content 110A and the second media content 110B from the first media source 114A and the second media source 114B, respectively. Details related to reception of the media content are described further, for example, in FIG. 3 (at 302).

The electronic device 102 may determine that the received media content includes the first media content 110A over the OTA media stream and the second media content 110B over the OTT media stream. The electronic device 102 may determine that the media content includes information that indicates presence of the first media content 110A and the second media content 110B. Details related to the determination that the received media content includes the first media content and the second media content are described further, for example, in FIG. 3 (at 304).

The electronic device 102 may be configured to compare a first bit rate of the OTA media stream (associated with the first media content 110A) with a second bit rate of the OTT media stream (associated with the second media content 110B), based on the determination that the received media content includes the first media content 110A and the second media content 110B. For example, the electronic device 102 may determine the first bit rate associated with the OTA media stream for the playback and the second bit rate associated with the OTT media stream for the playback. Thereafter, the electronic device 102 may compare the first bit rate and the second bit rate to determine that the first bit rate is lesser than the second bit rate. Details related to the comparison of the first bit rate with the second bit rate are described further, for example, in FIG. 3 (at 306).

The electronic device 102 may be configured to set a reported bit rate of the media player 112 to a second determined value higher than the second bit rate of the OTT media stream, based on the first bit rate being lower than the second bit rate. The electronic device 102 may first determine that the first bit rate is lower than the second bit rate. In case the first bit rate is lower than the second bit rate (i.e., the second bit rate is greater than the first bit rate), the electronic device 102 may set the reported bit rate of the media player 112 to a certain value or a predetermined value (i.e., the second determined value), which may be higher than the second bit rate. Thus, the reported bit rate may be set to a value greater than the higher bit rate (i.e., the second bit rate) among the first bit rate and the second bit rate. The second determined value may be the predetermined value higher than the second bit rate of the OTT media stream. Details related to the reported bit rate of the media player set to the second determined value are disclosed further, for example, in FIG. 3 (at 308).

The electronic device 102 may be configured to control the media player 112 to playback the second media content 110B, based on the reported bit rate set to the second determined value. The second determined value may be a predetermined value higher than the second bit rate. For example, in case the first bit rate is lower than the second bit rate, the reported bit rate of the media player 112 may be set as a certain value (i.e., the second determined value), which may be higher than the second bit rate. Based on the reported bit rate of the media player 112 set to the second determined value, the electronic device 102 may control the media player 112 to playback the second media content 110B (for e.g., from the OTT media stream). Details related to the control of the media player are described further, for example, in FIG. 3 (at 310).

The electronic device 102 may be configured to monitor a reception of the media content, based on the first bit rate higher than the second bit rate. For example, based on the comparison of the first bit rate and the second bit rate, the electronic device 102 may determine that the first bit rate is higher than the second bit rate. In case the first bit rate is determined as higher than the second bit rate, based on the comparison, the electronic device 102 may monitor the reception of the media content for the OTA playback. In an example, the reception of the media content may be monitored by use of an interrupt-based technique or a polling-based technique. Details related to the reception of the media content being monitored are described further, for example, in FIG. 3 (at 312).

The electronic device 102 may be configured to set the reported bit rate of the media player 112 to a third determined value higher than the first bit rate of the first media content 110A over the OTA media stream, based on the monitored reception of the media content. The third determined value may be a predetermined value higher than the first bit rate of the first media content 110A over the OTA media stream. The third determined value may be the predetermined value which may correspond to a bit rate higher than the determined first bit rate of the OTA media stream. Details related to the setting of the reported bit rate are disclosed further, for example, in FIG. 3 (at 314).

The electronic device 102 may be configured to control the media player 112 to playback the first media content 110A, based on the reported bit rate set to the third determined value. For example, in case the first bit rate is higher than the second bit rate, the electronic device 102 may monitor the reception of the media content (e.g., the first media content 110A and the second media content 110B) by the electronic device 102. Based on the monitored reception, the reported bit rate of the media player 112 may be set as a certain value (i.e., the third determined value), which may be higher than the first bit rate. Based on the reported bit rate of the media player 112 set to the third determined value, the electronic device 102 may control the media player 112 to playback the first media content 110A (from, e.g., the OTA media stream). Details related to the control of the media player are further disclosed, for example, in FIG. 3 (at 316).

Traditional systems may rely on a single media source, either broadband or broadcast, which may lead to interruptions in service if the source becomes unavailable or congested. In contrast, the present system may intelligently switch between broadband and broadcast sources based on various conditions such as service availability, connection quality, and video resolution, which may ensure a seamless viewing experience.

The present disclosure enables automatic adjustment of content playback based on the network conditions. For instance, if the quality of the broadband connection is low, the electronic device 102 may switch to a broadcast source to maintain continuous stream of the content. In an example, if a count of received media stream associated with a broadband source exceeds a threshold value of media stream associated with the broadcast source, the bit rate of the media player may be set to a bit rate higher than the bit rate of the broadcast source. Conversely, if the broadcast signal is weak, the system may dynamically switch to a broadband source to enhance picture quality. Thus, unlike traditional systems, the electronic device 102 may not require manual intervention to switch sources. Furthermore, the electronic device 102 may be designed to support both broadcast receivers that support broadband representations of live content, and also, applications that are designed to primarily support broadband playback of live content but also have access to a broadcast tuner. The dual support may allow the electronic device 102 to cater a wide range of use cases and scenarios, which may make the electronic device 102 more versatile than the traditional systems that support either broadcast or broadband delivery. The disclosed electronic device 102 may include features for detection of service availability and assessment of the quality of the service, which may help to ensure a robust and reliable video stream. Such features, combined with the adaptive capabilities, may work together to provide a superior viewing experience for live video content, regardless of the source of delivery. The disclosed electronic device 102 may thereby deliver a marked improvement in content playback experience over traditional systems, which may often struggle to maintain a consistent quality of service when faced with changing network conditions.

Figure 2:
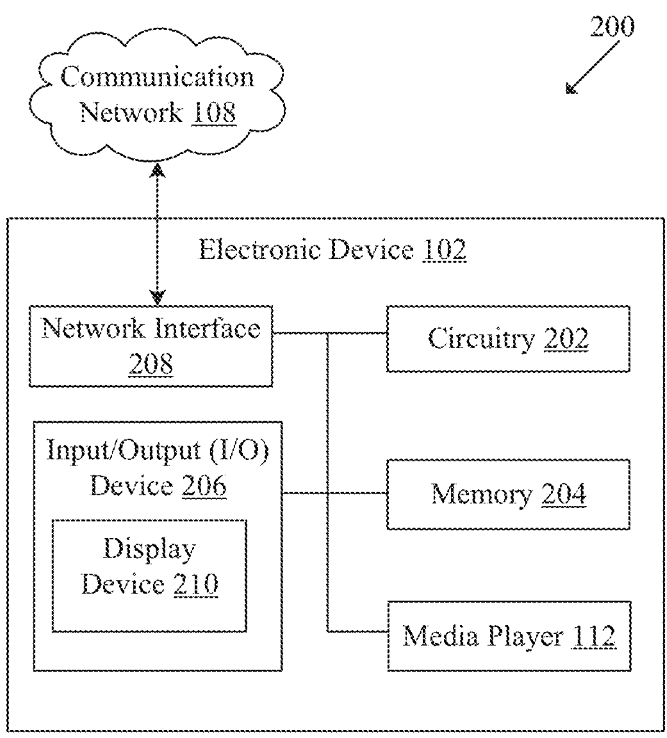
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown a block diagram 200 of the exemplary electronic device 102. The electronic device 102 may include the media player 112, a circuitry 202, a memory 204, an input/output (I/O) device 206, and a network interface 208. The memory 204 may store different types of media contents. The memory 204 may store the first media content 110A (e.g., the OTA media content) and the second media content 110B (e.g., the OTT media content). The input/output (I/O) device 206 may include a display device 210.

The circuitry 202 may include suitable logic, circuitry, and/or interfaces that may be configured to execute program instructions associated with different operations to be executed by the electronic device 102. The operations may include media content reception, one or more operations to set the reported bit, media streams determination, media streams bit rate comparison, a second media content playback initiation, an operation to monitor the reception of the media content, and a first media content playback initiation. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be further configured to store the first media content 110A and the second media content 110B. The memory 204 may store the media content sources 114. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input indicative of a selection of the media content for playback on the media player 112. The I/O device 206 may also receive a user input associated with the control of the media player 112 to playback the media content from a certain media source. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102 and the server 104, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render media content played back by the media player 112. The display device 210 may be a touch screen which may enable a user or users to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for implementation to adaptively switch between the media contents in the content delivery systems are described further, for example, in FIG. 3.

Figure 3:
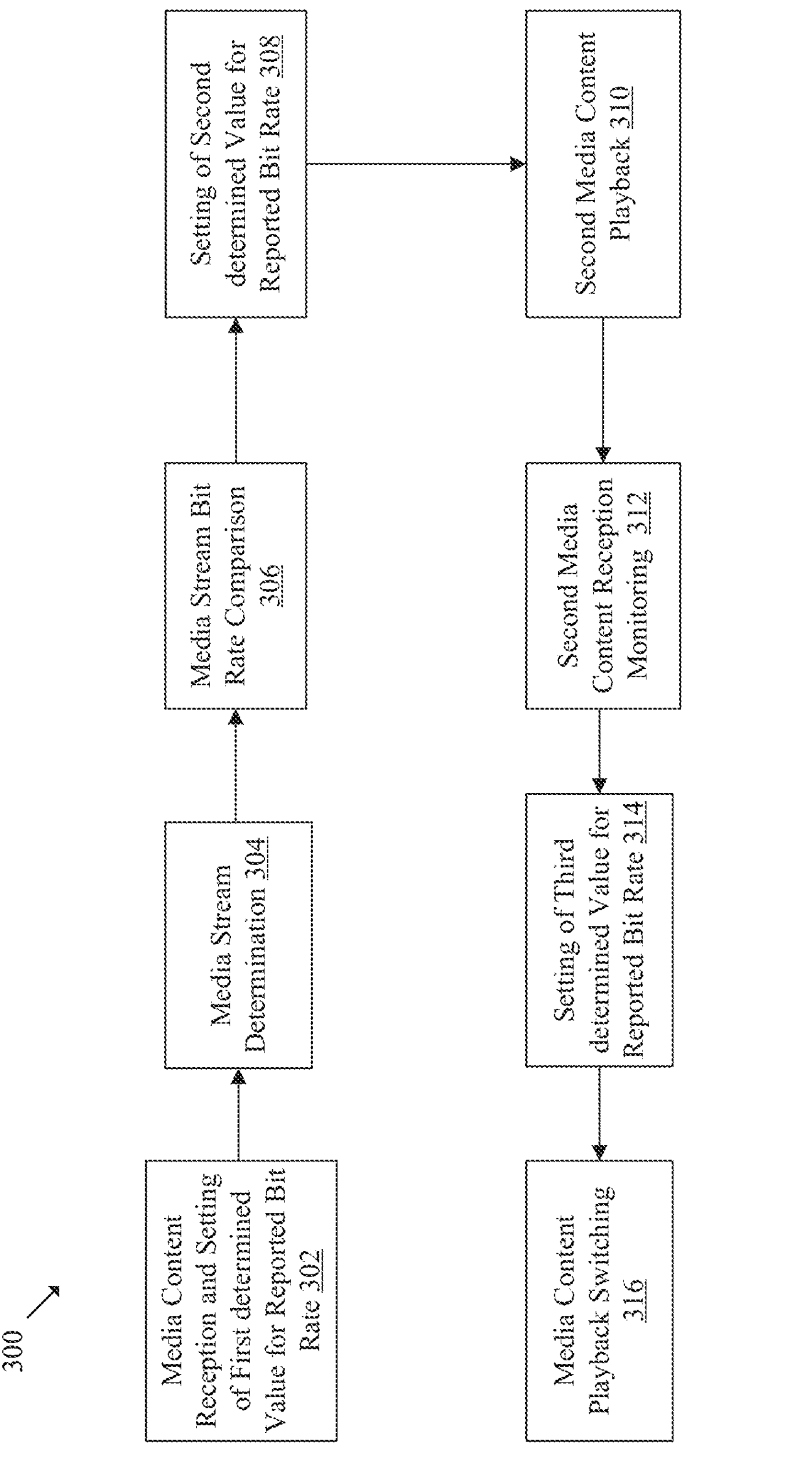
FIG. 3 is a diagram that illustrates an exemplary processing pipeline to adaptively switch between the media contents in the content delivery systems, in accordance with an embodiment of the disclosure.

FIG. 3 is a diagram that illustrates an exemplary processing pipeline to adaptively switch between the media contents in the content delivery systems, in accordance with an embodiment of the disclosure. FIG. 3 is explained in conjunction with elements from FIG. 1 and FIG. 2. With reference to FIG. 3, there is shown an exemplary processing pipeline 300 that illustrates exemplary operations from 302 to 316 for implementation of the electronic device 102 to adaptively switch between the media contents in the content delivery systems. The exemplary operations 302 to 316 may be executed by any computing system, for example, by the electronic device 102 of FIG. 1 or by the circuitry 202 of FIG. 2.

At 302, an operation to receive media content reception and to set the reported bit rate to the first determined value may be executed. The circuitry 202 may be configured to receive the media content for playback on the media player 112. The reported bit rate of the media player 112 may be set to the first determined value (e.g., an initial or default value). The electronic device 102 may retrieve the first media content 110A and the second media content 110B from the database 106. In an embodiment, the electronic device 102 may receive the first media content 110A from an OTA media stream (such as, the first media source 114A) and may receive the second media content 110B from an OTT media stream (such as, the second media source 114B). The circuitry 202 may be further configured to determine that the received media content includes the first media content 110A to be played over the OTA media stream and the second media content 110B to be played over the OTT media stream. For example, the electronic device 102 may be configured to receive a video stream content for playback on the media player 112. The received video stream content may be at a resolution of 480p at 30 frames per second (fps).

The media content sources 114 may provide the first media content 110A played over the OTA media stream and the second media content 110B and the second media content 110B as media content items. It may be appreciated that the term "media content item" should be understood to mean an electronically consumable user asset, such as television programming, as well as pay-per-view programs, on-demand programs, Internet content (e.g., streaming content, downloadable content, or Webcasts), video clips, audio, playlists, electronic books, social media, applications, games, any other media, or any combination thereof. The media content items may be recorded, played, displayed or accessed by devices.

At 304, an operation for media streams determination may be executed. The circuitry 202 may be configured to determine that the received media content includes the first media content 110A over the OTA media stream and the second media content 110B over the OTT media stream. For example, the received video stream content includes a first video content to be played over the OTA media stream at the resolution of 360p at 10 fps and a second video content to be played over the OTT media stream at 480p at 20 fps. In an example, media content received from each media source (i.e., the first media source 114A and the second media source 114B) may include information indicative of the respective media content that is currently streamed or a broadcast content. Based on receipt of such information from the respective media sources, the electronic device 102 may determine that the received media content includes the first media content 110A over the OTA media stream and the second media content 110B over the OTT media stream.

At 306, an operation for media stream bit rate comparison may be executed. The circuitry 202 may be configured to compare the first bit rate of the OTA media stream with the second bit rate of the OTT media stream, based on the determination that the received media content includes the first media content 110A and the second media content 110B. The OTA media stream may be the media stream corresponding to the first media content 110A and the OTT media stream may be the media stream corresponding to the second media content 110B. For example, a first bit rate of the first video content played over the OTA media stream at the resolution of 360p at 10 fps may be 500 kilo-bits per second, and a second bit rate of the second video content to be played over the OTT media stream at 480p at 20 fps may be 1500 kilo-bits per second. The first bit rate of "500" for the first video content may be compared with the second bit rate of "1500" for the second video content. Based on the comparison, the electronic device 102 may determine that the first bit rate is lower than the second bit rate.

At 308, an operation to set the reported bit rate to a second determined value may be executed. The circuitry 202 may be configured to set the reported bit rate of the media player 112 to the second determined value higher than the second bit rate of the OTT media stream, based on the first bit rate of the first media content 110A being lower than the second bit rate of the second media content 110B. The second determined value may be a predetermined value higher than the second bit rate of the OTT media stream. The second determined value may be the predetermined value that may correspond to the bit rate higher than the second bit rate of the OTT media stream. The second determined value may be the predetermined value that may correspond to the bit rate higher than the first bit rate of the OTA media stream.

In an example, the first bit rate of first media content 110A may be "500" kilo-bits per second and the second bit rate of second media content 110B may be "1500" kilo-bits per second. In the current scenario, based on the comparison of the first bit rate and the second bit rate, the electronic device 102 may determine that the first bit rate may be lower than the second bit rate. The electronic device 102 may set the reported bit rate of the media player 112 to a value (i.e., the second determined value) greater than the second bit rate. For example, the reported bit rate may be set as "2000" kilo-bits per second, which may be higher than the second bit rate of "1500" kilo-bits per second for the second video content. The circuitry 202 may be configured to control the media player 112 to playback of the second video content (i.e., the second media content 110B), based on the reported bit rate of the media player 112 set to the second determined value.

At 310, an operation for a second media content playback initiation may be executed. The circuitry 202 may be configured to control the media player 112 to playback of the second media content 110B, based on the reported bit rate of the media player 112 set to the second determined value. For example, based on the reported bit rate of the media player 112 set to the second determined value of "2000" kilo-bits per second, the electronic device 102 may control the media player 112 to playback the second media content 110B over the OTT media stream. In an example, the second bit rate of the second media content 110B may be "1500" kilo-bits per second. Thus, the playback of the second media content 110B may be initiated at an enhanced bit rate. For example, the second media content 110B may correspond to a video with the resolution of 480p at a frame rate of 20 fps. Based on the enhanced bit rate, the playback of the second media content 110B may be switched to a higher resolution of 720p and higher frame rate at 40 fps. The enhanced bit rate may enrich a viewing experience of the user.

At 312, an operation to monitor reception of media content may be executed. The circuitry 202 may be configured to monitor that the electronic device 102 may be controlled for playback of the first media content 110A, based on the first bit rate being higher than the second bit rate. For example, in case the first bit rate is "2100" kilo-bits per second for the first media content 110A and the second bit rate is "1500" kilo-bits per second for the second media content 110B, the electronic device 102 may select the first media content 110A over the OTA media stream for the playback. In order to playback the first media content 110A, the electronic device 102 may monitor the reception of the media content (e.g., the first media content 110A and the second media content 110B) by the electronic device 102, such that the first bit rate (e.g., "2100" kilo-bits per second) may be higher than the second bit rate (e.g., "1500" kilo-bits per second).

At 314, an operation to set the reported bit rate to a third determined value may be executed. The circuitry 202 may be configured to set the reported bit rate of the media player 112 to the third determined value, based on the monitored reception of the media content. In an example, the third determined value may be a predetermined value higher than the first bit rate of the OTA media stream. The reported bit rate set to the third determined value may ensure that the media player 112 may be able to handle a bandwidth required for the playback of first media content 110A.

At 316, the first media content playback initiation may be executed. The circuitry 202 may be configured to control the media player 112 to switch the playback from the second media content 110B to the first media content 110A, based on the reported bit rate of the media player 112 set to the third determined value. The circuitry 202 may be configured to control the media player 112 to switch the playback from the second media content 110B to the first media content 110A, based on the third determined value. The third determined value may be a predetermined value higher than the first bit rate of the OTA media stream. The third determined value may be the predetermined value which may correspond to the bit rate higher than the first bit rate of the OTA media stream.

For example, the media player 112 may playback the second media content 110B over the OTT media stream.

Upon a determination that the first bit rate of the first media content 110A is higher than the second media content 110B, the circuitry 202 may set the reported bit rate of the media player 112 to the third determined value (e.g., "5000" kilo-bits per second), which may be higher than the first bit rate (e.g., "2100" kilo-bits per second) of the first media content 110A over the OTA media stream. Based on the reported bit rate of the media player 112 being set as the third determined value, the electronic device 102 may control the media player 112 to switch the playback from the second media content 110B over the OTT media stream to the first media content 110A over the OTA media stream. As the reported bit rate may be set to a value higher than the first bit rate of the OTA media stream, the media player 112 may be able to playback the OTA media stream without any bandwidth issue. In an example, the first media content 110A over the OTA media stream may be played back at the resolution of 720p at the frame rate of 40 fps.

With reference to FIG. 3, at 308, in an embodiment, the circuitry 202 may be configured to determine a third bit rate of the OTT media stream, based on the reported bit rate of the media player 112 being set to the second determined value. The circuitry 202 may be configured to determine whether the determined third bit rate of the OTT media stream is lower than a fourth bit rate associated with the playback of the second media content 110B and an overhead associated with the OTT media stream. The monitored reception of the media content may correspond to the determination whether the determined third bit rate of the OTT media stream is lower than the fourth bit rate. The third determined value may be the predetermined value which may correspond to a bit rate higher than the determined third bit rate of the OTT media stream, based on the determination that the determined third bit rate is lower than the fourth bit rate. The media player 112 may be controlled to switch the playback from the second media content 110B to the first media content 110A, based on the third determined value being the bit rate higher than the determined third bit rate.

In an embodiment, the circuitry 202 may be further configured to determine whether the first bit rate of the OTA media stream is higher than the second bit rate of the OTA media stream, based on the comparison between the first bit rate and the second bit rate. The media player 112 may be controlled by the circuitry 202 to initiate the playback of the second media content 110B, based on the determination that the first bit rate is higher than the second bit rate. The circuitry 202 may be further configured to determine a first count of successful consecutive first segments of the OTA media stream. The circuitry 202 may be further configured to determine a second count of successful consecutive second segments of the OTT media stream. The circuitry 202 may be further configured to determine a third count of matching first segments and second segments, based on the determined first count of successful consecutive first segments and the determined second count of successful consecutive second segments. The circuitry 202 may be further configured to determine whether the determined third count exceeds a fourth determined value.

The monitored reception of the media content, at 312, may correspond to the determination whether the third count exceeds the fourth determined value. The third determined value may correspond to a bit rate higher than the first bit rate of the OTA media stream, based on the determination that the determined third count exceeds the fourth determined value. The media player 112 may be controlled to switch the playback from the second media content 110B to the first media content 110A, based on the third determined value. The third determined value may be the predetermined value higher than the first bit rate of the OTA media stream.

In an embodiment, the circuitry 202 may be further configured to determine a fourth count of errors associated with received OTA segments of the OTA media stream. The circuitry 202 may be further configured to determine whether the determined fourth count of errors exceeds a fifth determined value. The circuitry 202 may be further configured to set the reported bit rate of the media player 112 to a sixth determined value, based on the determination that the determined fourth count of errors exceeds the fifth determined value. The sixth determined value may be a predetermined value which may correspond to a value lower than the first bit rate of the OTA media stream and higher than the second bit rate of the OTT media stream. The circuitry 202 may be further configured to control the media player 112 to switch the playback from the first media content 110A to the second media content 110B, based on the setting of the reported bit rate of the media player 112 to the sixth determined value.

The electronic device 102 of the present disclosure may provide an automatic and robust framework to adaptively switch playback between the media contents in the media player 112. In order to do so, the electronic device 102 may receive the media content (e.g., the first media content 110A and the second media content 110B) for the playback. The reported bit rate of the media player 112 may be set to the first determined value. Thereafter, the electronic device 102 may determine that the received media content may include the first media content 110A to be played over the OTA media stream and the second media content 110B to be played over the OTT media stream. Based on the reported bit rate of the media player 112 set to the second determined value, the media player 112 is controlled to switch playback of the second media content 110B. Further, the electronic device 102 may monitor the reception of the media content (e.g., the first media content 110A and the second media content 110B). Based on the monitored reception of the media content, the reported bit rate of the media player 112 may be set to the third determined value. Further, the electronic device 102 may control the media player 112 to switch playback from the second media content 110B to the first media content 110A, based on the reported bit rate of the media player 112 set to the third determined value.

Traditional systems may rely on a single media source, either broadband or broadcast, which may lead to interruptions in service if the source becomes unavailable or congested. In contrast, the present system may intelligently switch between broadband and broadcast sources based on various conditions such as service availability, connection quality, and video resolution, which may ensure a seamless viewing experience.

Figure 4:
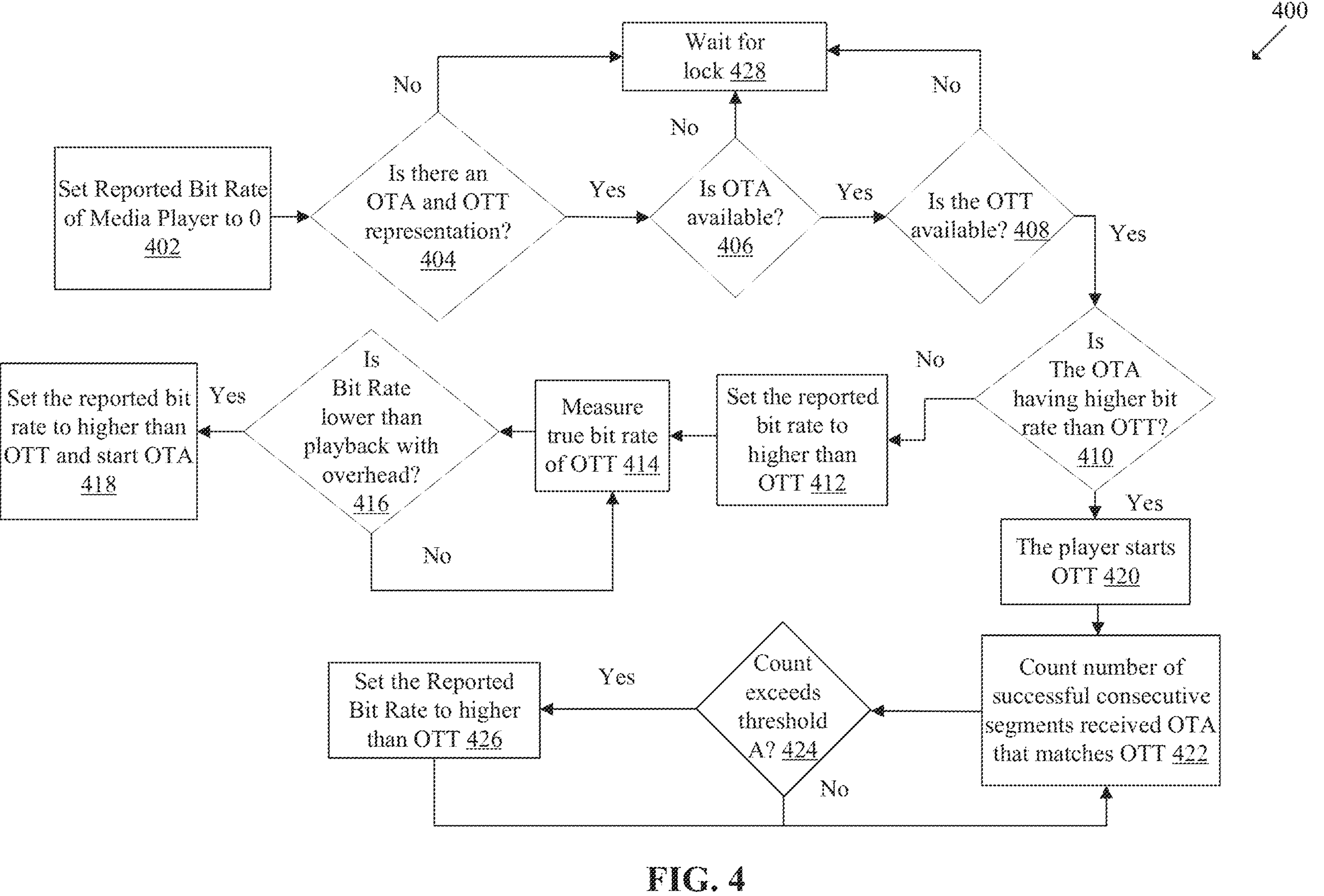
FIG. 4 is a flowchart that illustrates exemplary operations to adaptively switch between the media contents in the content delivery systems, in accordance with an embodiment of the disclosure.

The electronic device 102 of the present disclosure may have adaptive capabilities that may allow automatic adjustment of content playback transition based on the current conditions. For instance, if the quality of the broadband connection is low, the electronic device 102 may switch to the broadcast source to maintain continuous stream. Conversely, if the broadcast signal is weak, the electronic device 102 may dynamically switch to the broadband source to enhance picture quality. Thus, unlike traditional systems, the electronic device 102 of the present disclosure may not require manual intervention to switch sources. Furthermore, the electronic device 102 may be designed to support both broadcast receivers that support broadband representations of live content, and also, applications that are designed to primarily support broadband playback of live content but also have access to a broadcast tuner. The dual support may allow the electronic device 102 to cater to a wider range of use cases and scenarios, which may make the electronic device 102 more versatile than traditional systems that support either broadcast or broadband delivery FIG. 4 is flowchart that illustrates exemplary operations to adaptively switch between media contents in content delivery systems, in accordance with an embodiment of the disclosure. FIG. 4A is described in conjunction with elements from FIG. 1, FIG. 2, and FIG. 3. With reference to FIG. 4A, there is shown a flowchart 400. The flowchart 400 may include operations from 402 to 428 and may be implemented by the electronic device 102 of FIG. 1 or by the circuitry 202 of FIG. 2. The flowchart 400 may start at 402.

At 402, a reported bit rate of the media player 112 may be set to zero. The circuitry 202 may be configured to receive the media content for playback on the media player 112. The reported bit rate of the media player 112 may be set to a default value (e.g., a first determined value, such as, zero). Details related to the received media content are further described, for example, in FIG. 3 (at 302).

At 404, it may be determined whether the received media content is an OTA stream representation and an OTT stream representation. The circuitry 202 may be configured to determine that the received media content is the OTA media stream representation or the OTT media stream representation. In case it is determined that the received media content is the OTA media stream representation or the OTT media stream representation, control may pass to 406. Otherwise, control may pass to 428. Details related to the determination with respect to the media content as being the OTA media stream representation or the OTT media stream representation are further described, for example, in FIG. 3 (at 304).

At 406, it may be determined that the OTA media content is available (or connected) in the received media content. The circuitry 202 may be configured to determine if the received media content is available as the OTA media stream representation. In case it is determined that the OTA media content is available (or connected), control may pass to 408. Otherwise, control may pass to 428. Details related to the determination of the media content as the OTA media representation are further described, for example, in FIG. 3 (at 304).

At 408, it may be determined if the OTT media content is available (or connected) in the received media content. The circuitry 202 may be configured to determine if the received media content is available as the OTT media stream representation. In case it is determined that the OTT media content is available (or connected), control may pass to 410. Otherwise, control may pass to 428. Details related to the determination of the media content as the OTT media representation are further described, for example, in FIG. 3 (at 304).

At 410, it may be determined whether the first bit rate of the OTA media content is higher than the second bit rate of the OTT media content. The circuitry 202 may be configured to determine whether the first bit rate of the first media content 110A over the OTA media stream is higher than the second bit rate of the second media content 110B over the OTT media stream. In case it is determined that the first bit rate of the first media content 110A over the OTA media stream is higher than the second bit rate of the second media content 110B over the OTT media stream, control may pass to 420. Otherwise, control may pass to 412. Details related to the comparison between the first media content and the second media content are further described, for example, in FIG. 3 (at 306).

At 412, in case it is determined (at 410) that the first bit rate of the OTA media content is not higher than the second bit rate of the OTT media content, the reported bit rate of the media player 112 may be set to a value higher than the second bit rate of the OTT media content. The circuitry 202 may be configured to determine that the first bit rate of the OTA media content is not higher than the second bit rate of the OTT media content. The circuitry 202 may be configured to set the reported bit rate of the media player 112 to the second determined value. The second determined value may be the predetermined value higher than the second bit rate of the OTT media content. Details related to the setting of the reported bit rate of the media player to the second determined value higher than the second bit rate of the OTT media content are further described, for example, in FIG. 3 (at 308).

At 414, a true bit rate of the OTT media content may be measured or monitored. The circuitry 202 may be configured to monitor the reception of the OTT media content (i.e., true bit rate of the second media content 110B). Details related to the measurement and monitoring (reception) of the OTT media content are further described, for example, in FIG. 3 (at 310 and 312).

At 416, based on the monitored reception, it may be determined whether the bit rate of the OTT media content or the OTT media stream representation is lower than the playback with overhead. The circuitry 202 may be configured to determine if the bit rate of the OTT media content or the OTT media stream representation is lower than the playback with the overhead. In case it is determined that the bit rate of the OTT media content or the OTT media stream representation is lower than the playback with the overhead, control may pass to 414, and the receipt of the media content may be continued to be monitored. Otherwise, control may pass to 418. Details related to the determination that whether the bit rate of the OTT media content or the OTT media stream representation is lower than the playback with overhead are further described, for example, in FIG. 3 (at 312).

At 418, the reported bit rate of the media player 112 may be set to a higher bit rate than the second bit rate of the OTT media stream representation, and playback of the OTA media stream representation may be initiated. The circuitry 202 may be configured to set the reported bit rate of the media player 112 to the third determined value, based on the monitored reception of the media content. Further, the circuitry 202 may control the media player 112 to playback the first media content 110A associated with the OTA media stream. Details related to the setting of the reported bit rate of the media player 112 to the third determined value and OTA media stream representation playback initiation are further described, for example, in FIG. 3 (at 314 and 316)

At 420, in case it is determined (at 410) that the first bit rate of the OTA media content is higher than the second bit rate of the OTT media content, the media player 112 may be controlled to switch the playback to the second media content 110B associated with the OTT media stream. The circuitry 202 may be configured to determine that the first bit rate of the OTA media content is higher than the second bit rate of the OTT media content. The circuitry 202 may be configured to switch the playback to the second media content 110B associated with the OTT media stream. Details related to the playback switched to the second media content 110B and OTT media stream representation playback initiation are further described, for example, in FIG. 3 (at 310 to 312).

At 422, a number of successful consecutive segments of the received OTA media stream that matches the OTT media stream may be counted. The circuitry 202 may be configured to determine a first count of successful consecutive first segments of the OTA media stream. The circuitry 202 may be configured to determine a second count of successful consecutive second segments of the OTT media stream. The circuitry 202 may be configured to determine a third count of the successful consecutive first segments of the OTA media stream that matches the OTT media stream. Thus, the circuitry 202 may determine a count (i.e., the third count) of successful media segments of the OTA media stream and the OTT media stream that match each other. Details related to the count of the number of successful consecutive segments of the received OTA media stream that may match the OTT media stream are further described, for example, in FIG. 3 (at 312).

At 424, it may be determined whether the third count of the successful OTA segments that match the successful OTT segments exceed a threshold value "A". The circuitry 202 may be configured to determine whether the determined third count (i.e., a count of the successful OTA segments that match the successful OTT segments) exceeds a fourth determined value. The circuitry 202 may be configured to determine a fourth count of errors associated with the received OTA segments of the OTA media stream. The circuitry 202 may be configured to determine whether the determined fourth count exceeds a fifth determined value. In case the third count is determined as greater than the threshold "A" (i.e., the fourth threshold value), control may pass to 426. Otherwise, control may pass to 422 and the receipt of the media content may continue to be monitored. Details related to the determination whether the third count exceed the fourth determined value are further described, for example, in FIG. 3 (at 314).

At 426, the reported bit rate of the media player may be set to a bit rate higher than the bit rate of the OTT media stream, based on the determination that the count of the received OTA media stream exceeds the threshold value "A" of the OTT media stream. The circuitry 202 may be configured to set the reported bit rate of the media player 112 to a sixth determined value lower than the first bit rate and higher than the second bit rate, based on the determination that the determined fourth count exceeds the fifth determined value. Control may pass to 422 and the receipt of the media content may be continued to be monitored. Details related to the setting of the reported bit rate of the media player to the bit rate higher than the OTT media stream are further described, for example, in FIG. 3 (at 316).

At 428, the media player may start playback of the OTT media stream, based on the determinations at operations 404, 406, and 408 of FIG. 4. In an embodiment, the circuitry 202 may be configured to control (and initiate) the playback of the OTT media stream on the media player 112, based on a negative outcome of one or more of a first condition (of 404), a second condition (of 406), and a third condition (of 408). The first condition (of 404) may be the determination that whether there is an OTA and an OTT representation. The second condition (of 406) may be the determination that whether the OTA is available. The third condition (of 408) may be the determination that whether the OTT is available. In case any of the first condition (of 404), the second condition (of 406), or the third condition (of 408) evaluates to false, the circuitry 202 may control the media player 112 to playback the OTT media stream.

Although the flowchart 400 is illustrated as discrete operations, such as 402, 404, 406, 408, 410, 412, 414, 416, 418, 420, 422, 424, 426, and 428, the disclosure is not so limited. Accordingly, in certain embodiments, such discrete operations may be further divided into additional operations, combined into fewer operations, or eliminated, depending on the implementation without detracting from the essence of the disclosed embodiments.

Figure 5:
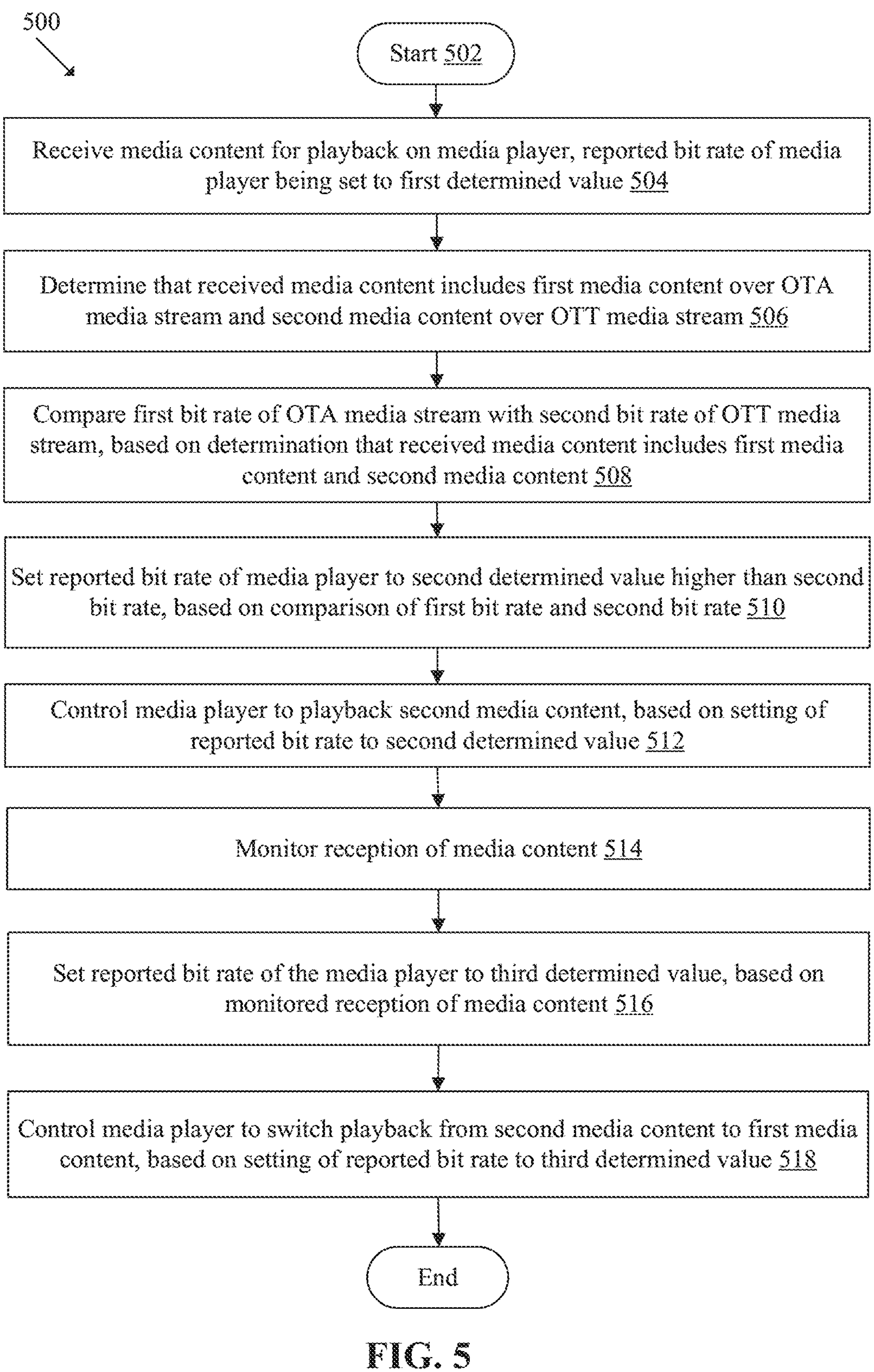
FIG. 5 is a flowchart that illustrates operations of an exemplary method to adaptively switch between the media contents in the content delivery systems, in accordance with an embodiment of the disclosure.

FIG. 5 is a flowchart that illustrates operations of an exemplary method 500 to adaptively switch between media contents in the content delivery systems, in accordance with an embodiment of the disclosure. FIG. 5 is described in conjunction with elements from FIG. 1, FIG. 2, FIG. 3, and FIG. 4. With reference to FIG. 5, there is shown an exemplary method 500. The exemplary method may include operations from 502 to 518 and may be implemented by the electronic device 102 of FIG. 1 or by the circuitry 202 of FIG. 2. The exemplary method 500 may start at 502 and proceed to 504.

At block 504, the media content may be received for the playback on the media player 112, wherein the reported bit rate of the media player 112 may be set to the first determined value. The circuitry 202 may be configured to receive the media content for playback on the media player 112. The reported bit rate of the media player 112 that receives the media content may be set to a default value (e.g., zero). Details related to the reception of the media content for playback on the media player 112 are described further, for example, in FIG. 3 (at 302).

At block 506, it may be determined that the received media content includes first media content 110A over the OTA media stream and second media content 110B over the OTT media stream. The circuitry 202 may be configured to determine that the received media content includes the first media content 110A over the OTA media stream and the second media content 110B over the OTT media stream. Details related to the determination of the media content are described further, for example, in FIG. 3 (at 304).

At block 508, the first bit rate of the OTA media stream may be compared with the second bit rate of the OTT media stream, based on the determination that the received media content includes the first media content 110A and the second media content 110B. The circuitry 202 may be configured to compare the first bit rate of the OTA media stream with the second bit rate of the OTT media stream, based on the determination that the received media content includes the first media content 110A and the second media content 110B. Details related to the comparison of the first bit rate and the second bit rate are described further, for example, in FIG. 3 (at 306).

At block 510, the reported bit rate of the media player 112 may be set to the second determined value higher than the second bit rate of the OTT media stream, based on the determination that the first bit rate is lower than the second bit rate. The circuitry 202 may be configured to set the reported bit rate of the media player 112 to the second determined value higher than the second bit rate of the OTT media stream, based on the comparison of the first bit rate of the first media content 110A and the second bit rate of the second media content 110B. The second determined value may be the predetermined value which may correspond to a bit rate higher than the first bit rate of the OTA media stream. Details related to the setting of the reported bit rate of the media player to the second determined value are further described, for example, in FIG. 3 (at 308).

At block 512, the media player 112 may be controlled to playback of the second media content 110B, based on the reported bit rate set to the second determined value. The circuitry 202 may be configured to control the media player 112 to playback the second media content 110B, based on the reported bit rate of the media player 112 set to the second determined value. Details related to the control of the playback of the second media content are described further, for example, in FIG. 3 (at 310).

At block 514, the reception of the media content may be monitored by the electronic device 102. The circuitry 202 may be configured to monitor the reception of the media content. The reception of the media content may be monitored, based on the first bit rate being higher than the second bit rate. Details related to the reception of the media content being monitored are described further, for example, in FIG. 3 (at 312).

At block 516, the reported bit rate of the media player 112 may be set to the third determined value higher than the first bit rate of the OTA media stream, based on the monitored reception of the media content. The circuitry 202 may be configured to set the reported bit rate of the media player 112 to the third determined value, based on the monitored reception of the media content. The third determined value may be the predetermined value which may correspond to the bit rate higher than the first bit rate of the OTA media stream and the determined third bit rate of the OTT media stream. Details related to the setting of the reported bit rate of the media player to the third determined value are described further, for example, in FIG. 3 (at 314).

At block 518, the media player 112 may be controlled to switch playback from the second media content 110B to the first media content 110A, based on the reported bit rate of the media player 112 set to the third determined value. The circuitry 202 may be configured to control the media player 112 to playback the first media content 110A, based on the reported bit rate of the media player 112 set to the third determined value. The circuitry 202 may be configured to control the media player 112 to switch the playback from the second media content 110B to the first media content 110A, based on the third determined value. The third determined value may be the predetermined value which may correspond to the bit rate higher than the first bit rate of the OTA media stream. Details related to the control of the media player 112 to playback the first media content 110A over the OTA media stream are described further, for example, in FIG. 3 (at 316). Control may pass to end.

Although the exemplary method 500 is illustrated as discrete operations, such as 502, 504, 506, 508, 510A, 512, 514, 516, and 518, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions by a machine and/or a computer to operate an electronic device (for example, the electronic device 102 of FIG. 1). Such instructions may cause the electronic device 102 to perform operations that may include receipt of media content for playback on a media player (e.g., the media player 112). A reported bit rate of the media player 112 may be set to a first determined value. The operations may further include determination that the received media content includes first media content (e.g., the first media content 110A) over an OTA media stream and second media content (e.g., the second media content 110B) over an OTT media stream. The operations may further include comparison of a first bit rate of the OTA media stream with a second bit rate of the OTT media stream, based on the determination that the received media content includes the first media content 110A and the second media content 110B. The operations may further include setting of the reported bit rate of the media player 112 to a second determined value higher than the second bit rate of the OTT media stream, based on the comparison between the first bit rate and the second bit rate. The operations may further include control of the media player 112 to playback of the second media content 110B, based on the reported bit rate of the media player 112 set to the second determined value. The operations may further include monitoring the reception of the media content. The operations may further include the reported bit rate of the media player 112 set to a third determined value, based on the monitored reception of the media content. The operations may further include control of the media player 112 to playback the first media content 110A, based on the reported bit rate of the media player 112 set to the second determined value.

Exemplary aspects of the disclosure may provide an electronic device (such as, the electronic device 102 of FIG. 1) that includes circuitry (such as, the circuitry 202). The circuitry 202 may be configured to receive media content for playback on the media player 112. The circuitry 202 may be configured to determine that the received media content includes first media content (e.g., the first media content 110A) over an OTA media stream and second media content (e.g., the second media content 110B) over an OTT media stream. The circuitry 202 may be configured to compare a first bit rate of the OTA media stream with a second bit rate of the OTT media stream, based on the determination that the received media content includes the first media content 110A and the second media content 110B. The circuitry 202 may be configured to set the reported bit rate of the media player 112 to the second determined value higher than the second bit rate of the OTT media stream, based on the comparison of the first bit rate and the second bit rate. The circuitry 202 may be configured to control the media player 112 to playback of the second media content 110B, based on the reported bit rate set to the second determined value. The circuitry 202 may be configured to monitor the reception of the media content. The circuitry 202 may be configured to set the reported bit rate of the media player 112 to the third determined value, based on the monitored reception of the media content. The circuitry 202 may be configured to control the media player 112 to switch playback from the second media content 110B to the first media content 110A, based on the reported bit rate set to the third determined value.

The circuitry 202 may be configured to determine a third bit rate of the OTT media stream, based on the reported bit rate of the media player 112 being set to the second determined value. The circuitry 202 may be configured to determine whether the determined third bit rate of the OTT media stream is lower than a fourth bit rate associated with the playback of the second media content 110B and an overhead associated with the OTT media stream. The monitored reception of the media content may correspond to the determination whether the determined third bit rate of the OTT media stream is lower than the fourth bit rate. The third determined value may be the predetermined value which may correspond to a bit rate higher than the determined third bit rate of the OTT media stream, based on the determination that the determined third bit rate is lower than the fourth bit rate. The media player 112 may be controlled to switch the playback from the second media content 110B to the first media content 110A, based on the third determined value being the bit rate higher than the determined third bit rate.

The circuitry may be further configured to determine whether the first bit rate of the OTA media stream is higher than the second bit rate of the OTA media stream, based on the comparison between the first bit rate and the second bit rate. The media player 112 may be controlled by the circuitry 202 to initiate the playback of the second media content 110B, based on the determination that the first bit rate is higher than the second bit rate. The circuitry 202 may be further configured to determine a first count of successful consecutive first segments of the OTA media stream. The circuitry 202 may be further configured to determine a second count of successful consecutive second segments of the OTT media stream. The circuitry 202 may be further configured to determine a third count of matching first segments and second segments, based on the determined first count of successful consecutive first segments and the determined second count of successful consecutive second segments. The circuitry 202 may be further configured to determine whether the determined third count exceeds a fourth determined value.

The monitored reception of the media content may correspond to the determination whether the third count exceeds the fourth determined value. The third determined value may correspond to a bit rate higher than the first bit rate of the OTA media stream, based on the determination that the determined third count exceeds the fourth determined value. The media player 112 may be controlled to switch the playback from the second media content 110B to the first media content 110A, based on the third determined value. The third determined value may be the predetermined value higher than the first bit rate of the OTA media stream.

The circuitry 202 may be further configured to determine a fourth count of errors associated with received OTA segments of the OTA media stream. The circuitry 202 may be further configured to determine whether the determined fourth count of errors exceeds a fifth determined value. The circuitry 202 may be further configured to set the reported bit rate of the media player 112 to a sixth determined value, based on the determination that the determined fourth count of errors exceeds the fifth determined value. The sixth determined value may correspond to a predetermined value lower than the first bit rate of the OTA media stream and higher than the second bit rate of the OTT media stream. The circuitry 202 may be further configured to control the media player 112 to switch the playback from the first media content 110A to the second media content 110B, based on the setting of the reported bit rate of the media player 112 to the sixth determined value.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:

circuitry configured to:

receive media content for playback on a media player, a reported bit rate of the media player being set to a first determined value;

determine the received media content includes first media content over an Over-The-Air (OTA) media stream and second media content over an Over-The-Top (OTT) media stream;

compare a first bit rate of the OTA media stream with a second bit rate of the OTT media stream, based on the determination that the received media content includes the first media content and the second media content;

set the reported bit rate of the media player to a second determined value higher than the second bit rate of the OTT media stream, based on the comparison of the first bit rate and the second bit rate;

control the media player to playback of the second media content, based on the set reported bit rate to the second determined value;

monitor the reception of the media content;

set the reported bit rate of the media player to a third determined value, based on the monitored reception of the media content; and control the media player to switch playback from the second media content to the first media content, based on the set reported bit rate to the third determined value.

2. The electronic device according to claim 1, wherein the circuitry is further configured to:

determine that the first bit rate is lower than the second bit rate, based on the comparison between the first bit rate and the second bit rate, wherein the reported bit rate of the media player is set to the second determined value higher than the second bit rate, based on the determination that the first bit rate is lower than the second bit rate, and the media player is controlled to playback of the second media content, based on the reported bit rate of the media player being set to the second determined value.

3. The electronic device according to claim 2, wherein the circuitry is further configured to:

determine a third bit rate of the OTT media stream, based on the reported bit rate of the media player being set to the second determined value; and determine that the determined third bit rate of the OTT media stream is lower than a fourth bit rate associated with the playback of the second media content and an overhead associated with the OTT media stream.

4. The electronic device according to claim 3, wherein the monitored reception of the media content corresponds to the determination that the determined third bit rate of the OTT media stream is lower than the fourth bit rate, the third determined value corresponds to a bit rate higher than the determined third bit rate of the OTT media stream, based on the determination that the determined third bit rate is lower than a fourth bit rate, and the media player is controlled to switch playback from the second media content to the first media content, based on the third determined value being the bit rate higher than the determined third bit rate.

5. The electronic device according to claim 1, wherein the circuitry is further configured to:

determine that the first bit rate is higher than the second bit rate, based on the comparison between the first bit rate and the second bit rate, wherein the media player is controlled to playback of the second media content, based on the determination that the first bit rate is higher than the second bit rate.

6. The electronic device according to claim 5, wherein the circuitry is further configured to:

determine a first count of successful consecutive first segments of the OTA media stream;

determine a second count of successful consecutive second segments of the OTT media stream;

determine a third count of matching first segments and second segments, based on the determined first count and the determined second count; and determine that the determined third count exceeds a fourth determined value.

7. The electronic device according to claim 6, wherein the monitored reception of the media content corresponds to the determination that the third count exceeds the fourth determined value, the third determined value corresponds to a bit rate higher than the first bit rate of the OTA media stream, based on the determination that the determined third count exceeds the fourth determined value, and the media player is controlled to switch playback from the second media content to the first media content, based on the third determined value being the bit rate higher than the first bit rate.

8. The electronic device according to claim 1, wherein the circuitry is further configured to:

determine a fourth count of errors associated with received OTA segments of the OTA media stream;

determine that the determined fourth count exceeds a fifth determined value;

set the reported bit rate of the media player to a sixth determined value lower than the first bit rate and higher than the second bit rate, based on the determination that the determined fourth count exceeds the fifth determined value; and control the media player to switch playback from the first media content to the second media content, based on the setting of the reported bit rate to the sixth determined value.

9. A method, comprising:

in an electronic device:

receiving media content for playback on a media player, a reported bit rate of the media player being set to a first determined value;

determining that the received media content includes first media content over an Over-The-Air (OTA) media stream and second media content over an Over-The-Top (OTT) media stream;

comparing a first bit rate of the OTA media stream with a second bit rate of the OTT media stream, based on the determination that the received media content includes the first media content and the second media content;

setting the reported bit rate of the media player to a second determined value higher than the second bit rate of the OTT media stream, based on the comparison of the first bit rate and the second bit rate;

controlling the media player to playback of the second media content, based on the set reported bit rate to the second determined value;

monitoring the reception of the media content;

setting the reported bit rate of the media player to a third determined value, based on the monitored reception of the media content; and controlling the media player to switch playback from the second media content to the first media content, based on the set reported bit rate to the third determined value.

10. The method according to claim 9, further comprising:

determining that the first bit rate is lower than the second bit rate, based on the comparison between the first bit rate and the second bit rate, wherein the reported bit rate of the media player is set to the second determined value higher than the second bit rate, based on the determination that the first bit rate is lower than the second bit rate, and the media player is controlled to playback of the second media content, based on the reported bit rate of the media player being set to the second determined value.

11. The method according to claim 10, further comprising:

determining a third bit rate of the OTT media stream, based on the reported bit rate of the media player being set to the second determined value; and determining that the determined third bit rate of the OTT media stream is lower than a fourth bit rate associated with the playback of the second media content and an overhead associated with the OTT media stream.

12. The method according to claim 11, wherein the monitoring of the reception of the media content corresponds to the determination that the determined third bit rate of the OTT media stream is lower than the fourth bit rate, the third determined value corresponds to a bit rate higher than the determined third bit rate of the OTT media stream, based on the determination that the determined third bit rate is lower than a fourth bit rate, and the media player is controlled to switch playback from the second media content to the first media content, based on the third determined value being the bit rate higher than the determined third bit rate.

13. The method according to claim 9, further comprising:

determining that the first bit rate is higher than the second bit rate, based on the comparison between the first bit rate and the second bit rate, wherein the media player is controlled to playback of the second media content, based on the determination that the first bit rate is higher than the second bit rate.

14. The method according to claim 13, further comprising:

determining a first count of successful consecutive first segments of the OTA media stream;

determining a second count of successful consecutive second segments of the OTT media stream;

determining a third count of matching first segments and second segments, based on the determined first count and the determined second count; and determining that the determined third count exceeds a fourth determined value.

15. The method according to claim 14, wherein the monitoring of the reception of the media content corresponds to the determination that the third count exceeds the fourth determined value, the third determined value corresponds to a bit rate higher than the first bit rate of the OTA media stream, based on the determination that the determined third count exceeds the fourth determined value, and the media player is controlled to switch playback from the second media content to the first media content, based on the third determined value being the bit rate higher than the first bit rate.

16. The method according to claim 9, further comprising:

determining a fourth count of errors associated with received OTA segments of the OTA media stream;

determining that the determined fourth count exceeds a fifth determined value;

setting the reported bit rate of the media player to a sixth determined value lower than the first bit rate and higher than the second bit rate, based on the determination that the determined fourth count exceeds the fifth determined value; and controlling the media player to switch playback from the first media content to the second media content, based on the set reported bit rate to the sixth determined value.

17. A non-transitory computer-readable medium having stored thereon, computer-executable instructions that when executed by an electronic device, causes the electronic device to execute operations, the operations comprising:

receiving media content for playback on a media player, a reported bit rate of the media player being set to a first determined value;

determining that the received media content includes first media content over an Over-The-Air (OTA) media stream and second media content over an Over-The-Top (OTT) media stream;

comparing a first bit rate of the OTA media stream with a second bit rate of the OTT media stream, based on the determination that the received media content includes the first media content and the second media content;

setting the reported bit rate of the media player to a second determined value higher than the second bit rate of the OTT media stream, based on the comparison of the first bit rate and the second bit rate;

controlling the media player to playback of the second media content, based on the setting of the reported bit rate to the second determined value;

monitoring the reception of the media content;

setting the reported bit rate of the media player to a third determined value, based on the monitored reception of the media content; and controlling the media player to switch playback from the second media content to the first media content, based on the set reported bit rate to the third determined value.

18. The non-transitory computer-readable medium according to claim 17, wherein the operations further comprise:

determining that the first bit rate is lower than the second bit rate, based on the comparison between the first bit rate and the second bit rate, wherein the reported bit rate of the media player is set to the second determined value higher than the second bit rate, based on the determination that the first bit rate is lower than the second bit rate, and the media player is controlled to playback of the second media content, based on the reported bit rate of the media player being set to the second determined value.

19. The non-transitory computer-readable medium according to claim 18, wherein the operations further comprise:

determining a third bit rate of the OTT media stream, based on the reported bit rate of the media player being set to the second determined value; and determining that the determined third bit rate of the OTT media stream is lower than a fourth bit rate associated with the playback of the second media content and an overhead associated with the OTT media stream.

20. The non-transitory computer-readable medium according to claim 19, wherein the monitoring of the reception of the media content corresponds to the determination that the determined third bit rate of the OTT media stream is lower than the fourth bit rate, the third determined value corresponds to a bit rate higher than the determined third bit rate of the OTT media stream, based on the determination that the determined third bit rate is lower than a fourth bit rate, and the media player is controlled to switch playback from the second media content to the first media content, based on the third determined value being the bit rate higher than the determined third bit rate.

* * * * *